J. F. TRITLE.
CONTROLLER.
APPLICATION FILED JUNE 25, 1918.
1,281,100.
Patented Oct. 8, 1918.
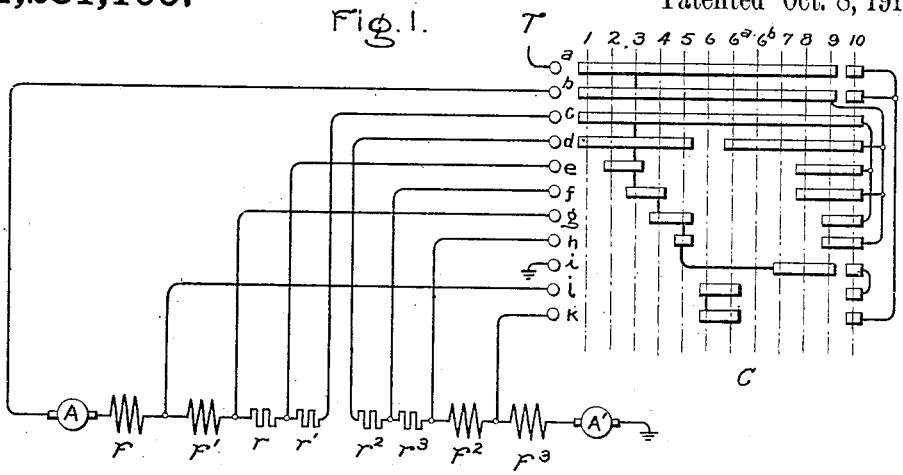
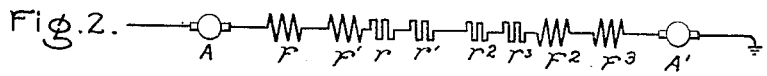
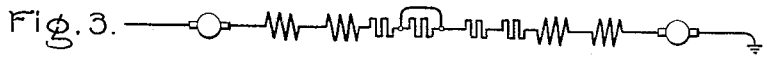
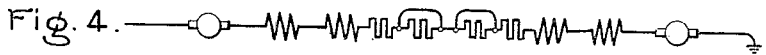
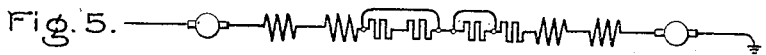
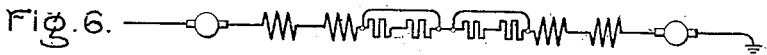
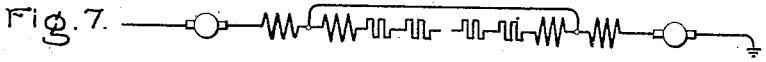
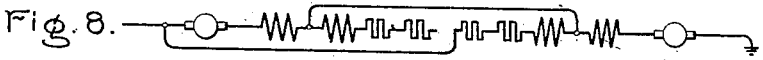
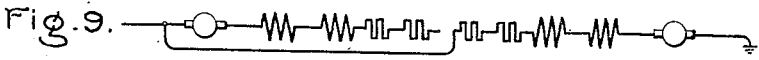
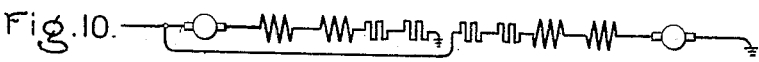
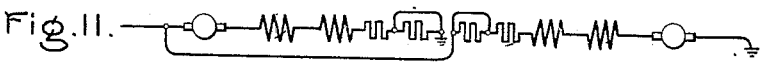
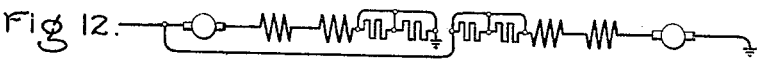
Inventor:
John F. Tritle,
by
His Attorney.

UNITED STATES PATENT OFFICE.

JOHN F. TRITLE, OF SCHENECTADY, NEW YORK, ASSIGNOR TO GENERAL ELECTRIC COMPANY, A CORPORATION OF NEW YORK.

CONTROLLER.

1,281,100.  Specification of Letters Patent.  Patented Oct. 8, 1918.

Application filed June 25, 1918. Serial No. 241,888.

*To all whom it may concern:*

Be it known that I, JOHN F. TRITLE, a citizen of the United States, residing at Schenectady, in the county of Schenectady, State of New York, have invented certain new and useful Improvements in Controllers, of which the following is a specification.

My invention relates to the control of series wound electric motors and has for its object the provision of improved means whereby a plurality of such motors may be operated and controlled in an efficient manner.

My invention relates more particularly to a series-parallel system of control for a plurality of series wound motors and provides a sequence of connections utilizing intermediate taps in the field windings for securing additional running positions and a greater range of speed control, by weakening the fields of the various motors. Heretofore difficulty has been experienced in securing the proper connections for tapped field motors during transition from series to parallel relation, as it is necessary to pass from the tapped field series arrangement to the first parallel arrangement with full field, and it is desirable during this transition, in order to eliminate the sag in torque, to avoid dropping back to the full field series position.

In patent to F. E. Case, No. 1,263,373, April 23, 1918, there is described a system employing a pair of motors with divided field windings in which the field windings of the two motors are connected between the two armatures. After the resistance is cut out of the motor circuit, a shunting connection is established between intermediate taps of the field windings of the two motors thereby weakening the fields and giving a higher running speed. The bridge connection is then established with the shunting connection maintained, both motors being connected to ground in the bridge connection. The shunting connection is then broken and the motors connected in parallel with full field. It will be noted in this arrangement that in the bridge connection the tapped out portions of the fields of both motors are excited directly across the line. This superexcites the fields of the motors, thus increasing the counter electromotive force of the armature and causes a momentary drop in the armature torque or if the speed of the armature is high enough the motors may pump-back on to the line. In accordance with my invention I avoid this difficulty by delaying the closing of the ground connection to one of the motors until after the bridge connection is opened, thereby eliminating the super-excitation. This entirely eliminates one of the motors from circuit during the transition, but is found in practice that it is out of circuit such a short time that there is no noticeable jerk on the car during the transfer.

A better understanding of my invention will be had by referring to the accompanying drawing in which Figure 1 illustrates diagrammatically a pair of motors and a controller by means of which the various steps in my control system are accomplished; Figs. 2 to 13 show successive steps.

Referring to the drawing A and A' represent respectively the armatures of the two series wound motors, each having its field divided into two parts as at F, F' and F², F³ respectively. The sections of starting resistance, $r$, $r'$, $r^2$ and $r^3$ are provided for varying the speed of the motors. C is a controller, which as shown is of the ordinary drum type provided with contact fingers $a$ to $k$ coöperating with contacts arranged to provide the desired motor connections. The various running positions are indicated by dotted lines of which 1 to 5 are the series positions; in position 6 the field shunting connection is made; 6ª and 6ᵇ indicate the transition steps, and 7 to 10 are the parallel positions. The first controller finger $a$ is connected through the lead T to the source of current. When the controller C is moved to the first running position indicated by the dotter line 1, the motors are connected to the source of current in series with each other and with the resistances $r$, $r'$, $r^2$, and $r^3$ as shown in Fig. 2.

As the controller is moved from position 1 to position 2, the section of resistance $r'$ is short-circuited, and as the controller is progressively moved through positions 3, 4 and 5, the other sections of resistance are short-circuited, as shown in Figs. 3 to 6 inclusive, and as the controller is moved forward to position 6, a shunting connection is established between the intermediate points in the field windings of the two motors, and the connection between the resistances $r'$ and $r^2$ is broken. This arrangement, illustrated in Fig. 7, gives a weakened field condition. Position 6ª represents the transition step. It will be noted that in this step, as shown in Fig. 8, the ground connection of the first motor is not made, thereby overcoming the difficulty above referred to of connecting the shunted out portions of the fields in series to line. When the controller is advanced to the position 6ᵇ, the shunting connection is broken and the arrangement shown in Fig. 9 is established. It will be noted from this figure that the first motor is eliminated from the circuit, but it is only for an instant and the effect is not noticeable. When the controller reaches position 7 the motors are in parallel with all the resistance in circuit, and as shown in Fig. 10 and in the remaining positions, the resistances are cut out of circuit until the motors are in full parallel as shown in Fig. 12 and finally the parallel position with the part of the fields shunted is reached, as shown in Fig. 13.

I have set forth above the principle of operation of my invention and have described and illustrated the same in a specific arrangement but it will be obvious to those skilled in the art that various changes and modifications may be made without departing from the spirit of my invention, the scope of which is set forth in the appended claims.

What I claim as new and desire to secure by Letters Patent of the United States, is:—

1. The series parallel method of control for a plurality of series motors which consists in connecting the motors in series, weakening the fields by shunting a portion of each, connecting both motors to one side of the line and only one motor to the other side, which motor shall have full field so that only one motor is energized and then connecting the other motor to the other side of the line to form a parallel connection of the motors with the full field.

2. The series parallel method of control for a plurality of series motors which consists in connecting the motors in series, with the field windings between the armatures, establishing a shunting connection across intermediate portions of the field windings to reduce the field strength, connecting both motors to one side of the line and only one motor to the other side of the line, which motor shall have full field so that only one motor is energized and then connecting the other motor to the other side of the line to form a parallel connection of the motors with full field.

3. The series parallel method of control for a plurality of series motors which consists in connecting the motors in series with the field windings between the armatures, establishing a shunting connection across intermediate portions of the field windings to reduce the field strength and breaking the main connection between the fields, energizing one of the shunted portions while maintaining said shunting connection, then breaking the shunting connection and finally energizing the other motor to form a parallel connection.

In witness whereof, I have hereunto set my hand this 24th day of June 1918.

JOHN F. TRITLE.

Copies of this patent may be obtained for five cents each, by addressing the "Commissioner of Patents, Washington, D. C."